(12) United States Patent
Rosemeier et al.

(10) Patent No.: US 11,155,164 B2
(45) Date of Patent: Oct. 26, 2021

(54) CONNECTION OF AN OIL PUMP TO A HYBRID TRANSMISSION OF A MOTOR VEHICLE HAVING AN ELECTRIC MOTOR ARRANGED AXIALLY PARALLEL TO A DRIVE SHAFT

(71) Applicant: ZF Friedrichshafen AG, Friedrichshafen (DE)

(72) Inventors: Thomas Rosemeier, Meckenbeuren (DE); Michael Roske, Friedrichshafen (DE); Raffael Kuberczyk, Ravensburg (DE); Juri Pawlakowitsch, Kressbronn (DE); Bernd Unseld, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 120 days.

(21) Appl. No.: 16/462,021

(22) PCT Filed: Nov. 6, 2017

(86) PCT No.: PCT/EP2017/078272
§ 371 (c)(1),
(2) Date: May 17, 2019

(87) PCT Pub. No.: WO2018/095713
PCT Pub. Date: May 31, 2018

(65) Prior Publication Data
US 2019/0329648 A1    Oct. 31, 2019

(30) Foreign Application Priority Data
Nov. 24, 2016 (DE) ............... 10 2016 223 265.7

(51) Int. Cl.
*B60K 6/50* (2007.10)
*B60K 25/02* (2006.01)
(Continued)

(52) U.S. Cl.
CPC .............. *B60K 25/02* (2013.01); *B60K 6/383* (2013.01); *B60K 6/48* (2013.01);
(Continued)

(58) Field of Classification Search
CPC .......... B60K 6/20; B60K 6/383; B60K 25/02; B60K 25/00; B60K 6/48;
(Continued)

(56) References Cited

U.S. PATENT DOCUMENTS 5,755,303 A    5/1998   Yamamoto et al.
7,455,159 B2   11/2008  Agner et al.
(Continued)

FOREIGN PATENT DOCUMENTS

DE       10119235 A1    10/2001
DE    102007016218 A1   11/2008
(Continued)

OTHER PUBLICATIONS

International Search Report (English Translation) PCT/EP2017/078272, dated Jan. 30, 2018. (3 pages).
(Continued)

*Primary Examiner* — Toan C To
(74) *Attorney, Agent, or Firm* — Dority & Manning, P.A.

(57) ABSTRACT

A connection of an oil pump (1) to a hybrid transmission of a motor vehicle includes an electric machine (3) arranged axially parallel to a transmission input shaft (2). A drive of the oil pump (1) is connected in the operative connection between the transmission input shaft (2) and the electric machine (3) via an intermediate gear (5) of a spur gear drive or via a chain drive (10).

12 Claims, 3 Drawing Sheets

(51) Int. Cl.
  *B60K 6/383* (2007.10)
  *B60K 6/48* (2007.10)
  *F16H 61/00* (2006.01)

(52) U.S. Cl.
  CPC ... *B60K 2006/4816* (2013.01); *B60Y 2200/92* (2013.01); *F16H 61/0025* (2013.01)

(58) Field of Classification Search
  CPC ......... B60K 2006/4816; F16H 61/0031; F16H 57/0441; F16H 61/0025; B60Y 2200/92; Y02T 10/6256
  See application file for complete search history.

(56) References Cited

U.S. PATENT DOCUMENTS

| | | | |
|---|---|---|---|
| 8,695,743 B2 | 4/2014 | Kraxner | |
| 2002/0043124 A1 | 4/2002 | Shiga et al. | |
| 2008/0096711 A1 | 4/2008 | Smith et al. | |
| 2009/0023529 A1 | 1/2009 | Sanji et al. | |
| 2012/0021861 A1* | 1/2012 | Sakai | B60L 15/2054 475/5 |
| 2012/0322603 A1* | 12/2012 | Kuroda | B60K 6/48 475/5 |
| 2013/0096761 A1* | 4/2013 | Kuroda | B60W 20/10 701/22 |
| 2013/0333552 A1* | 12/2013 | Foitzik | B60L 7/26 92/140 |
| 2016/0207393 A1* | 7/2016 | Takamiya | B60K 6/48 |
| 2016/0229392 A1* | 8/2016 | Sugitani | B60K 6/445 |
| 2016/0244050 A1* | 8/2016 | Ouchi | B60W 10/107 |
| 2017/0096058 A1* | 4/2017 | Kanada | F16H 57/02 |
| 2017/0217299 A1 | 8/2017 | Schenker et al. | |
| 2018/0073628 A1* | 3/2018 | Mouri | F16H 61/0025 |
| 2018/0079418 A1* | 3/2018 | Iwasa | B60W 10/10 |
| 2018/0304747 A1 | 10/2018 | Vollmer | |

FOREIGN PATENT DOCUMENTS

| | | |
|---|---|---|
| DE | 112008000534 T5 | 12/2009 |
| DE | 102008040495 A1 | 1/2010 |
| DE | 202010002882 U1 | 7/2010 |
| DE | 102009016673 A1 | 10/2010 |
| DE | 102011120376 A1 | 6/2013 |
| DE | 102014016172 A1 | 5/2016 |
| EP | 1610017 A1 | 12/2005 |
| EP | 2497668 A2 | 9/2012 |
| JP | 2007245900 A | 9/2007 |
| WO | WO 2010/007123 | 1/2010 |

OTHER PUBLICATIONS

German Search Report DE102016223265.7, dated Apr. 25, 2017. (12 pages).

* cited by examiner

CONNECTION OF AN OIL PUMP TO A HYBRID TRANSMISSION OF A MOTOR VEHICLE HAVING AN ELECTRIC MOTOR ARRANGED AXIALLY PARALLEL TO A DRIVE SHAFT

FIELD OF THE INVENTION

The invention relates generally to the connection of an oil pump to a hybrid transmission of a motor vehicle that includes an electric machine arranged axially parallel to an input shaft.

BACKGROUND

From the prior art, it is known, with respect to hybrid transmissions, to connect the electric machine directly to the input shaft of the transmission or to arrange the electric machine axially parallel to the input shaft and connect the electric machine to the input shaft via a gear stage or a chain drive. Moreover, it is known from the prior art, with respect to motor vehicle transmissions, to drive the oil pump generally with the aid of the input shaft via a separate spur gear drive or chain drive, which requires axial installation space.

DE 10 2007 016 218 A1 describes a hybrid drive device for motor vehicles, including an electric motor connected between an internal combustion engine and a variable speed transmission, in which the rotor and the stator of the electric motor are arranged around the force delivery shaft of the internal combustion engine and/or the coaxial input shaft of the variable speed transmission, wherein the rotor is indirectly or directly drivingly connected to the force delivery shaft and/or to the input shaft. It is provided that the rotor and the stator of the electric motor are arranged, via an intermediate connection of a gear drive, so as to be offset with respect to the force delivery shaft and/or the input shaft. In the known hybrid drive device, the rotor can be arranged on an internally geared ring gear which is engaged with a spur gear mounted on the force delivery shaft or the input shaft, wherein at least two further, circumferentially offset spur gears can be provided within the rotor, which are housing-affixed and rotatably mounted and which, in connection with the inputting and/or outputting first spur gear, form the rotational mounting of the rotor, wherein at least one of the circumferentially offset spur gears can cooperate with a drive, which is arranged adjacent to the rotor and the stator of the electric motor, for an auxiliary unit of the motor vehicle arranged at the side of the electric motor, which requires axial installation space. A gearwheel, which is rotationally fixed to the drive of the auxiliary unit, is engaged with a gearwheel which is rotationally fixed to the rotor.

DE 10 2014 016 172 A1 describes a further drive device for a hybrid-driven motor vehicle including an internal combustion engine and at least one electric machine arranged axially parallel to the internal combustion engine. The internal combustion engine and the electric machine, separately or jointly, output onto the input shaft of a variable speed transmission, wherein the electric machine is drivingly connected to the coaxially aligned transmission input shaft via a connection which transmits torque onto the force delivery shaft of the internal combustion engine, via an intermediate connection of at least one clutch, wherein the electric machine is mounted directly onto the internal combustion engine or is integrated therein, and the cylinder crankcase is expanded with a housing section, in which the torque-transmitting connection is arranged. In this case, the torque-transmitting connection is formed by a spur gear drive comprising a gearwheel on the drive shaft of the electric machine and an, in particular, larger gearwheel on the force delivery shaft of the internal combustion engine, wherein it can be provided that the gearwheel on the force delivery shaft is engaged with a further gearwheel, with the aid of which the at least one auxiliary unit of the internal combustion engine can be driven.

SUMMARY OF THE INVENTION

Example aspects of the present invention provide a connection of an oil pump to a hybrid transmission of a motor vehicle that includes an electric machine arranged axially parallel to an input shaft.

Therefore, a connection of an oil pump to a hybrid transmission of a motor vehicle that includes an electric machine arranged axially parallel to a transmission input shaft is provided, in which a drive of the oil pump is connected to an intermediate gear of a spur gear drive, via which the transmission input shaft is operatively connected to an electric machine.

Due to the design according to the invention, the installation space available between the transmission input shaft and the electric machine may be utilized for the placement of the oil pump without the need to provide additional axial installation space. Moreover, with the aid of an appropriate configuration, the ratio with respect to the oil pump may be selected regardless of the configuration of the electric machine.

A gearwheel which is rotationally fixed to the drive of the oil pump and which is utilized for the connection to the intermediate gear may be designed as a spur gear or as a crown gear. The design as a crown gear results in high flexibility with respect to the utilization of the existing installation space. The gearwheel may be advantageously formed from plastic, in particular for the case in which the intermediate gear has large dimensions.

A planetary transmission, which includes a sun gear, a carrier, and a ring gear, may be arranged in the operative connection between the drive of the oil pump and the intermediate gear of the spur gear drive. Planet gears, which are engaged with the sun gear and with the ring gear, are rotatably mounted on the carrier. The drive of the oil pump is connected to the carrier, and the intermediate gear is connected either to the sun gear or to the ring gear. The remaining element, i.e., the sun gear or the ring gear, is connected to a second electric machine. The pump may be driven with the aid of the second electric machine, even when the electric machine, which is operatively connected to the transmission input shaft, is at rest.

It is particularly preferred when the ring gear of the planetary transmission is designed as internal gearing of the intermediate gear. In other words, the intermediate gear includes, in addition to an external gearing for transmitting torque between the transmission input shaft and the electric machine, an internal gearing which operates as a ring gear of the planetary transmission. Alternatively, the ring gear of the planetary transmission is designed as internal gearing of the gearwheel, the external gearing of which intermeshes with the intermediate gear.

Within the scope of one further embodiment of the invention, for the case in which the transmission input shaft is operatively connected to the electric machine via a chain drive in a hybrid transmission of a motor vehicle that includes an electric machine arranged axially parallel to a transmission input shaft, the oil pump may be driven via the electric machine with the aid of a further chain drive, wherein, according to a preferred embodiment of the invention, the rotor of the electric machine is rotationally fixed, for this purpose, to a double sprocket that includes two sprockets arranged coaxially and rotationally fixedly with respect to one another, wherein one sprocket is operatively connected to a sprocket, which is rotationally fixed to the transmission input shaft, and the other sprocket is operatively connected to a sprocket which is operatively connected to the drive of the oil pump. In this way, no additional axial installation space is required.

A planetary transmission, which includes a sun gear, a carrier, and a ring gear, may be arranged in the operative connection between the drive of the oil pump and the sprocket which is operatively connected to the drive of the oil pump. Planet gears, which are engaged with the sun gear and with the ring gear, are rotatably mounted on the carrier. The drive of the oil pump is connected to the carrier. The sprocket of the further chain drive, which is associated with the oil pump, is connected either to the sun gear or to the ring gear. The remaining element, i.e., the sun gear or the ring gear, is connected to a second electric machine. The pump may be driven with the aid of the second electric machine, even when the electric machine, which is operatively connected to the transmission input shaft, is at rest.

It is particularly preferred when the ring gear of the planetary transmission is designed as the internal gearing of the sprocket of the further chain drive that is associated with the oil pump. In other words, the sprocket includes, in addition to an external gearing for transmitting torque between the sprocket and the chain, an internal gearing which operates as a ring gear of the planetary transmission.

BRIEF DESCRIPTION OF THE DRAWINGS

The invention is explained in greater detail in the following, by way of example, with reference to the attached figures. Wherein.

DETAILED DESCRIPTION

Figure 1:
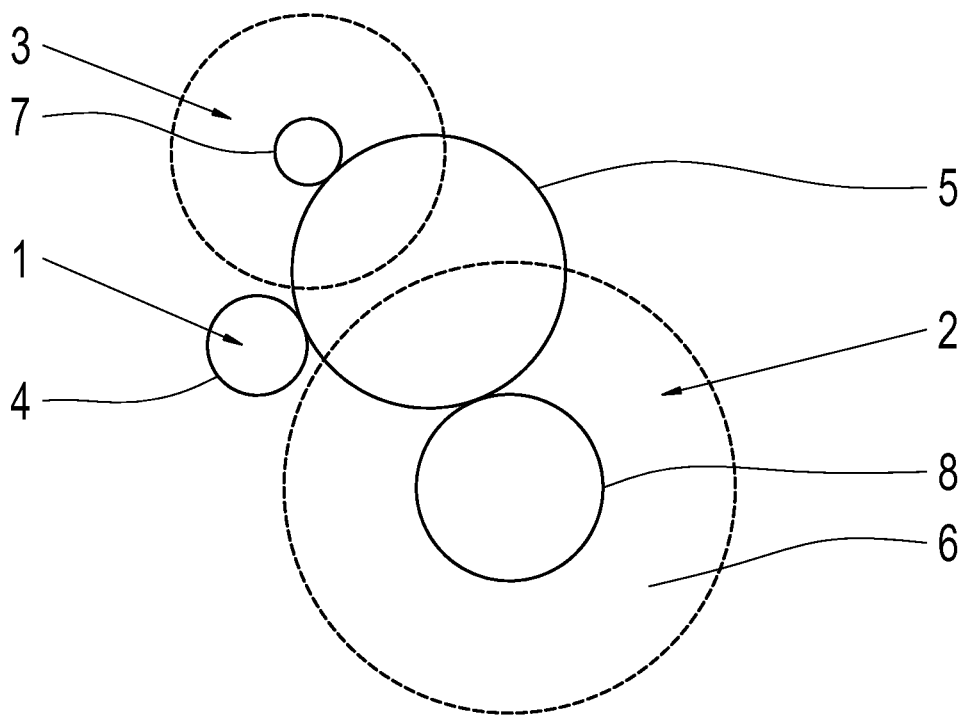
FIG. 1: shows a diagrammatic view of an exemplary arrangement of the oil pump and the connection of the oil pump to a hybrid transmission according to one embodiment of the invention for the case in which the transmission input shaft is operatively connected to an electric machine via a spur gear including an intermediate gear.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

According to example aspects of the invention, and with reference to FIG. 1, a connection of an oil pump 1 to a hybrid transmission of a motor vehicle that includes an electric machine 3 arranged axially parallel to a transmission input shaft 2 is provided, in the case of which a gearwheel 4, which is rotationally fixed to the drive of the oil pump 1 and is designed as a spur gear, is engaged with an intermediate gear 5 of a spur gear drive, via which the transmission input shaft 2 is operatively connected to the electric machine 3.

In FIG. 1, the gear set driven by the transmission input shaft 2 is marked as 6. The spur gear drive includes the intermediate gear 5, a gearwheel 7 rotationally fixed to the rotor of the electric machine 3, and a gearwheel 8 rotationally fixed to the transmission input shaft 2.

Figure 2:
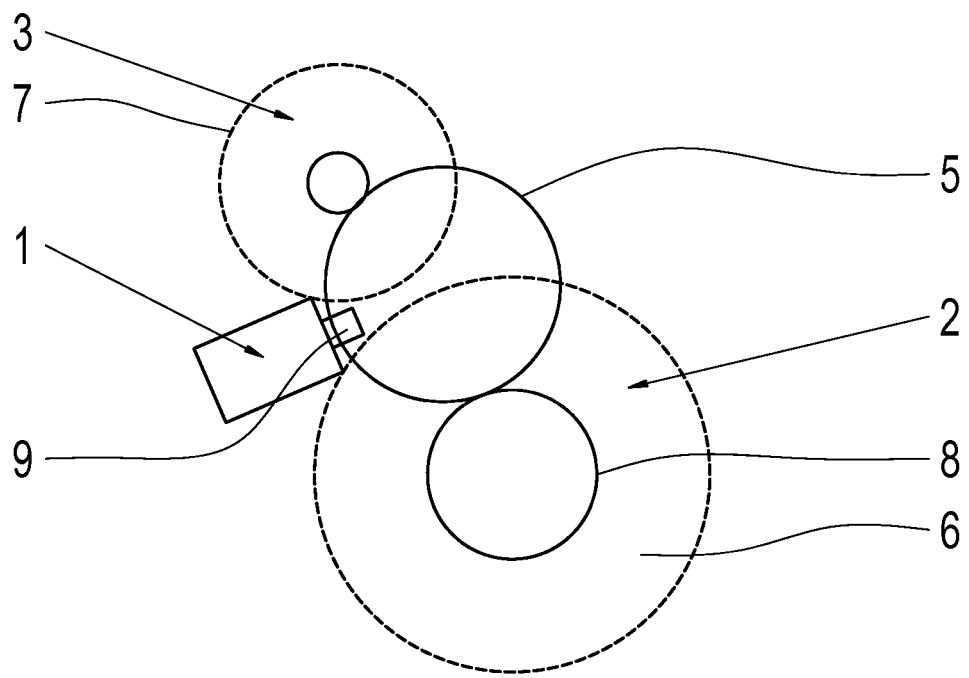
FIG. 2: shows a diagrammatic view of an exemplary arrangement of the oil pump and the connection of the oil pump to a hybrid transmission according to a further embodiment of the invention for the case in which the transmission input shaft is operatively connected to an electric machine via a spur gear including an intermediate gear.
Figure 3:
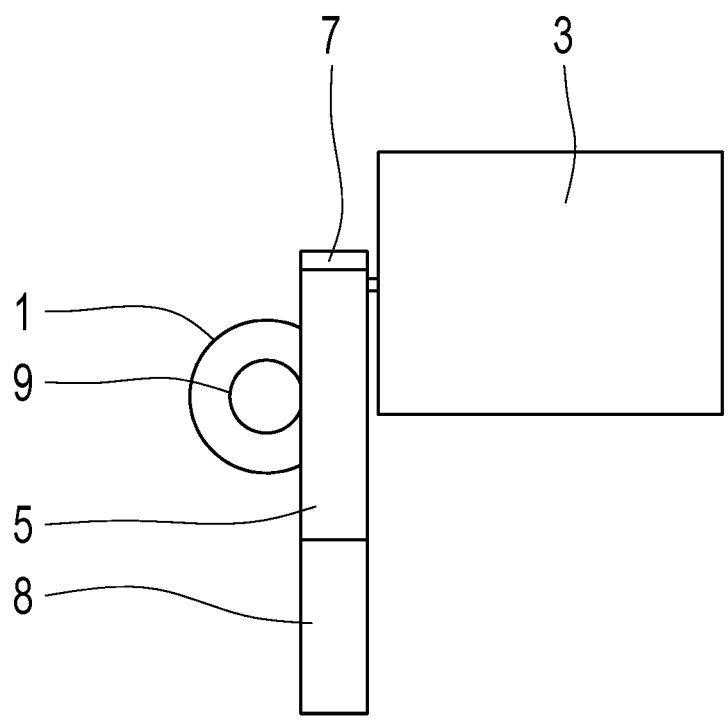
FIG. 3: shows a side view of the arrangement according to FIG. 2.

Within the scope of a refinement of the invention, which is the object of FIGS. 2 and 3, a gearwheel 9, which is rotationally fixed to the drive of the oil pump 1 and is designed as a crown gear, is engaged with an intermediate gear 5 of the spur gear drive, via which the transmission input shaft 2 is operatively connected to the electric machine 3. Due to this embodiment, the oil pump 1 can be arranged so as to be rotated by 90° as compared to the embodiment according to FIG. 1.

Figure 4:
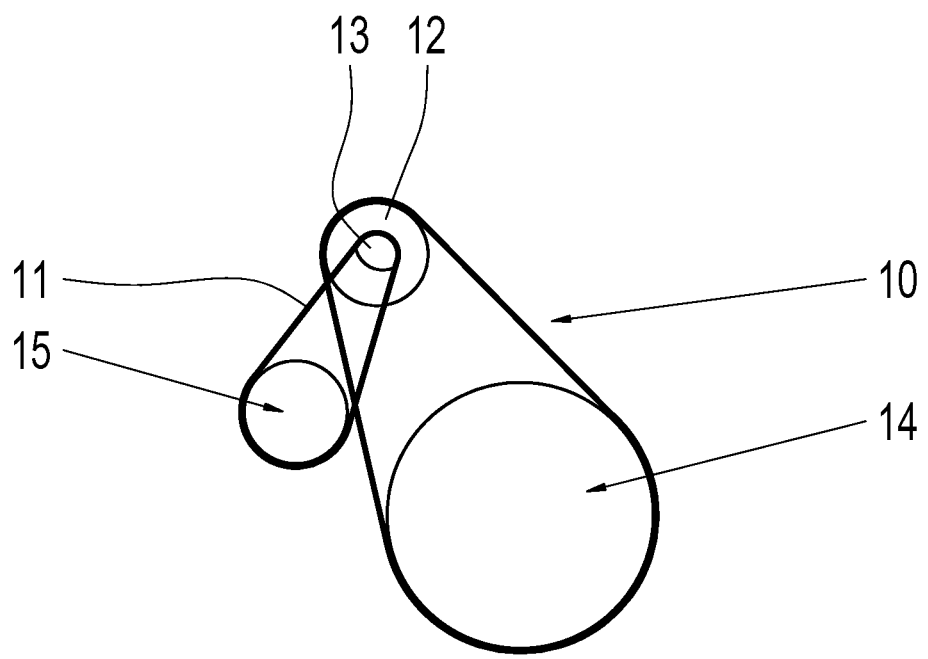
FIG. 4: shows a diagrammatic view of an exemplary arrangement of the oil pump and the connection of the oil pump to a hybrid transmission according to a further embodiment of the invention for the case in which the transmission input shaft is operatively connected to an electric machine via a chain drive.

In the exemplary embodiment according to FIG. 4, in a hybrid transmission of a motor vehicle that includes an electric machine arranged axially parallel to the transmission input shaft, the transmission input shaft is operatively connected to the electric machine via a chain drive 10.

In this case, the oil pump may be driven via the electric machine with the aid of a further chain drive 11, wherein the rotor of the electric machine, in the example shown, is rotationally fixed to a double sprocket 12 including two sprockets 12, 13 arranged coaxially and rotationally fixedly with respect to one another. One sprocket 12 is operatively connected to a sprocket 14, which is rotationally fixed to the transmission input shaft, and the other sprocket 13 is operatively connected to a sprocket 15 which is operatively connected to the drive of the oil pump.

Figure 5:
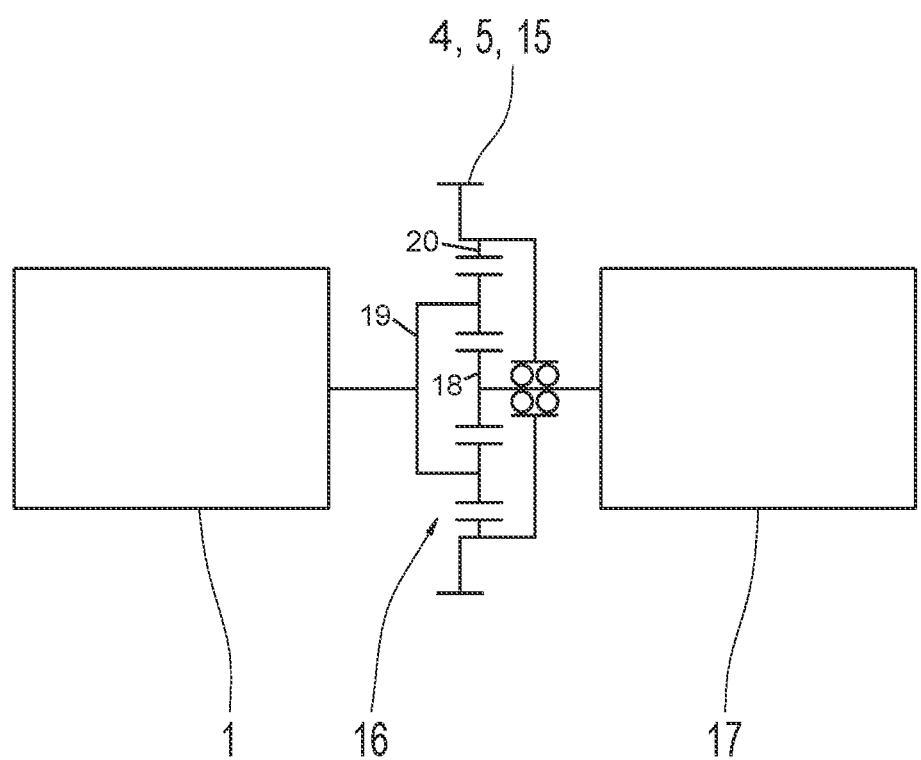
FIG. 5: shows a diagrammatic view of the operative connection between the oil pump and the transmission input shaft.

FIG. 5 shows a diagrammatic view of the operative connection between the oil pump 1 and the transmission input shaft 2 that includes an interconnected planetary transmission 16. A second electric machine 17 is connected to a sun gear 18 of the planetary transmission 16. The oil pump 1 is connected to a carrier 19 of the planetary transmission 16. The ring gear 20 of the planetary transmission 16 is designed as an internal gearing of a component which, in addition to the internal gearing, also includes an external gearing. In an embodiment including a chain drive, the external gearing forms the sprocket 15, and in an embodiment including a spur gear drive, the external gearing forms the intermediate gear 5 or the gearwheel 4.

Modifications and variations can be made to the embodiments illustrated or described herein without departing from the scope and spirit of the invention as set forth in the appended claims.

REFERENCE CHARACTERS

1 oil pump
2 transmission input shaft 3 electric machine
4 gearwheel
5 intermediate gear
6 gear set
7 gearwheel
8 gearwheel
9 gearwheel
10 chain drive
11 chain drive
12 double sprocket
13 sprocket
14 sprocket
15 sprocket
16 planetary transmission
17 second electric machine

The invention claimed is:

1. A connection of an oil pump (1) to a hybrid transmission of a motor vehicle, comprising an electric machine (3) arranged axially parallel to a transmission input shaft (2), wherein a drive of the oil pump (1) is connected to an intermediate gear (5) of a spur gear drive, and the transmission input shaft (2) is operatively connected to the electric machine (3) via the intermediate gear (5) of the spur gear drive.

2. The connection of claim 1, further comprising a gearwheel rotationally fixed to the drive of the oil pump (1), wherein the gearwheel connects the drive of the oil pump (1) to the intermediate gear (5) of the spur gear drive, and the gearwheel is a spur gear (4) or a crown gear (9).

3. The connection of claim 2, wherein the gearwheel (4, 9) rotationally fixed to the drive of the oil pump (1) is formed from plastic.

4. The connection of claim 1, further comprising a planetary transmission (16) including a sun gear, a carrier, and a ring gear, the planetary transmission (16) arranged in the operative connection between the drive of the oil pump (1) and the intermediate gear (5) of the spur gear drive, wherein the drive of the oil pump (1) is connected to the carrier, the intermediate gear (5) is connected to one of the sun gear and the ring gear, and the other of the sun gear and the ring gear is connected to a second electric machine (17).

5. The connection of claim 4, wherein the ring gear of the planetary transmission (16) comprises an internal gearing of the intermediate gear (5).

6. The connection of claim 4, wherein the ring gear of the planetary transmission (16) comprises an internal gearing of a gearwheel (4), and an external gearing of the gearwheel (4) meshes with the intermediate gear (5).

7. The connection of claim 1, wherein the electric machine (3) is arranged eccentric to the transmission input shaft (2).

8. A connection of an oil pump (1) to a hybrid transmission of a motor vehicle, comprising an electric machine arranged axially parallel to a transmission input shaft (2), wherein the transmission input shaft (2) is operatively connected to the electric machine (3) via a chain drive (10), and the oil pump (1) is drivable by the electric machine (3) via a further chain drive (11).

9. The connection of claim 8, wherein a rotor of the electric machine (3) is rotationally fixed to a double sprocket (12) comprising two sprockets (12, 13) arranged coaxially and rotationally fixedly with respect to each other, one of the two sprockets (12) is operatively connected to a first additional sprocket (14) that is rotationally fixed to the transmission input shaft (2), and the other of the two sprockets (13) is operatively connected to a second additional sprocket (15) that is operatively connected to the drive of the oil pump (1).

10. The connection of claim 8, further comprising a planetary transmission (16) including a sun gear, a carrier, and a ring gear, the planetary transmission (16) arranged in the operative connection between the oil pump (1) and the second additional sprocket (15), wherein the drive of the oil pump (1) is connected to the carrier, the second additional sprocket (15) is connected to one of the sun gear and the ring gear, and the other of the sun gear and the ring gear is connected to a second electric machine (17).

11. The connection of claim 10, wherein the ring gear comprises an internal gearing of the second additional sprocket (15).

12. The connection of claim 8, wherein the electric machine is arranged eccentric to the transmission input shaft (2).

* * * * *